(No Model.) 2 Sheets—Sheet 1.
N. SIMIN.
SAFETY WATER CONDUCT AGAINST FIRES.
No. 471,699. Patented Mar. 29, 1892.
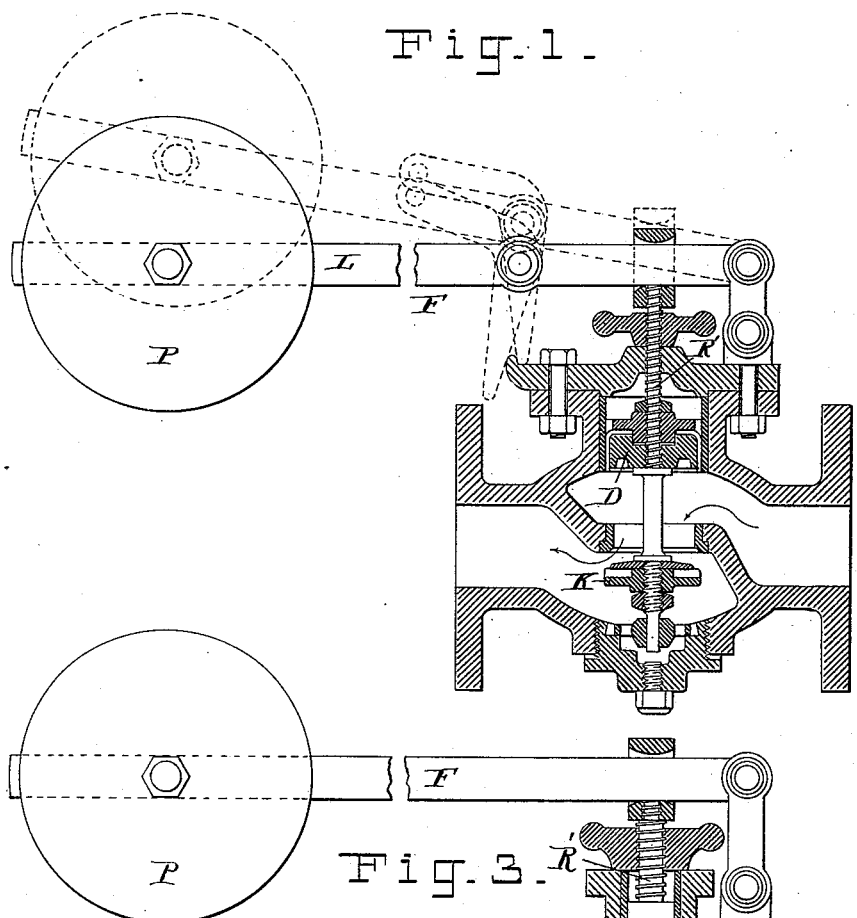
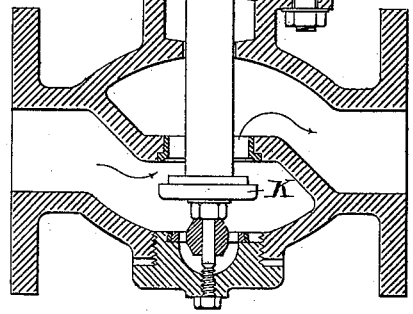

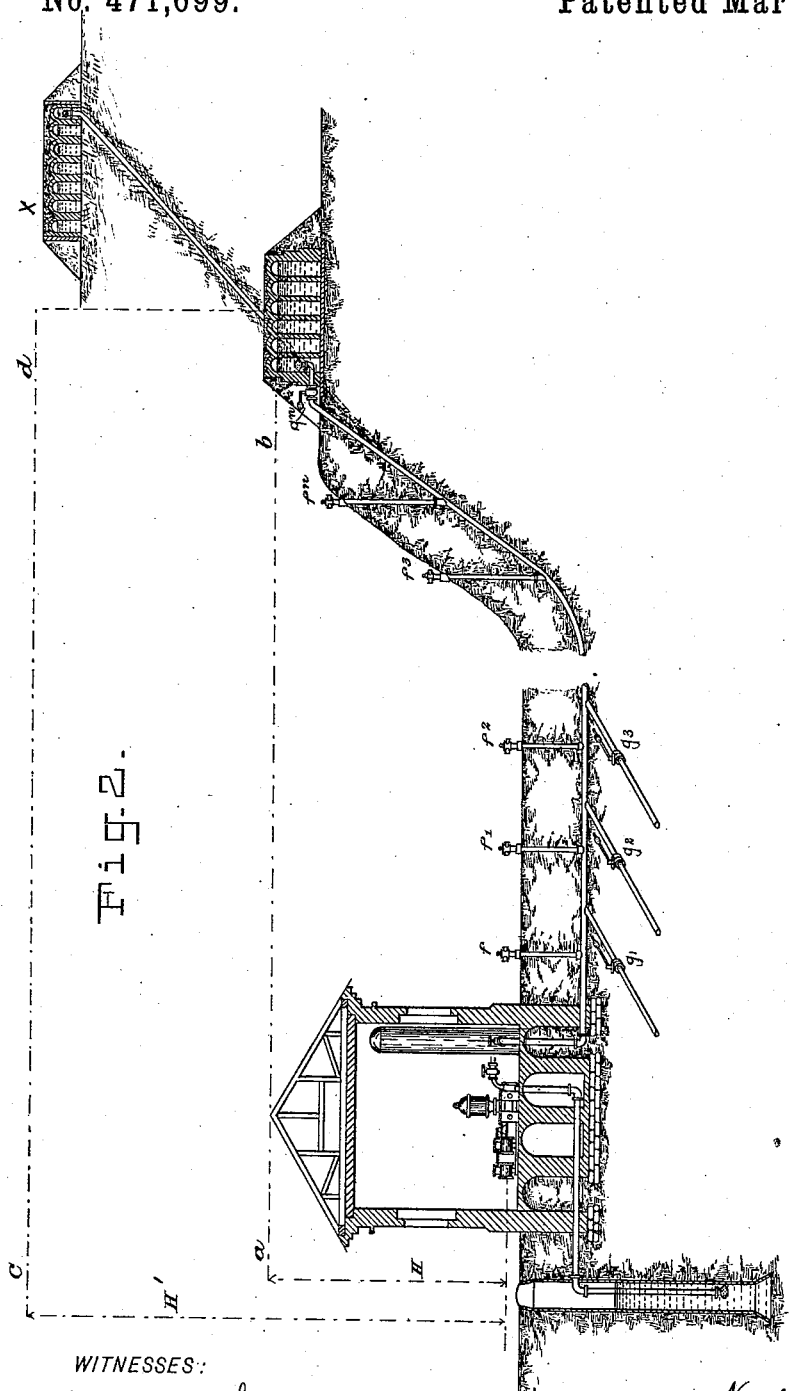

UNITED STATES PATENT OFFICE.

NICHOLAS SIMIN, OF MOSCOW, RUSSIA.

SAFETY WATER-CONDUCT AGAINST FIRES.

SPECIFICATION forming part of Letters Patent No. 471,699, dated March 29, 1892.

Application filed October 11, 1889. Serial No. 326,702. (No model.) Patented in France July 16, 1889, No. 199,615; in Germany July 21, 1889, No. 15,473; in Belgium August 3, 1889, No. 87,250, and in England August 3, 1889, No. 12,370.

*To all whom it may concern:*

Be it known that I, NICHOLAS SIMIN, a subject of the Emperor of Russia, residing at Moscow, Russia, have invented a new and useful System of Water-Works Insuring a Full Supply of Water in Case of Fire, (patented in France July 16, 1889, No. 199,615; in Germany July 21, 1889, No. 15,473; in Belgium August 3, 1889, No. 87,250, and in England August 3, 1889, No. 12,370,) of which the following is a full, clear, and exact description, reference being had to the accompanying drawings, which are hereby made a part of this specification.

A system of water-works must answer the following requirements to work efficaciously in case of fire: First, the water must constantly and in sufficient quantity flow from the hydrants attached to the pipes; second, the pressure on the water in the pipes must be sufficient to enable it to be used directly in case of fire without necessitating pumps.

The uses and capacity of the works are calculated on the basis of water used for domestic purposes, and it often happens that the entire quantity of water is used for household requirements. If it is intended to make the plant capable of fighting fire and at the same time supplying water for domestic purposes, it is generally deemed sufficient to enlarge the dimensions of the different parts. Engineers state that the quantity of water flowing from a hydrant for use in case of fire should be at least eight thousand six hundred liters per minute or twelve millions three hundred thousand liters in twenty-four hours. It is obvious that a surplus of this magnitude is not in the reach of all cities and still less available for small towns. If a city has not water-works yielding much more than is required for domestic use, none of the present systems can warrant efficacious workings of the hydrants in case of fire, and pecuniary considerations generally forbid such magnitude of plant. If at a certain time the use of water is small, as during the night, the water in the pipes could be used, though under weak pressure; but if a fire should break out during the day, when the demand for water is greater and even equal to the capacity of the plant there would be no water to fight the fire, and the consequences might be and have often been found to be disastrous.

My system of water-works insures such a supply of water as is necessary to fight the fire, can be used in cities, villages, factories, and in general in any locality, and is based upon the following principle: In case of fire the distribution of water for domestic purposes, fountains,&c., is automatically stopped by means of increase of pressure in the pipes and the entire quantity of water delivered by the pipes is used under a higher pressure to fight the fire. Under this system it is possible to use the water-pipes in case of fire without a considerable increase in the cost of construction.

Another advantage of my system is that the quantity of water for the fire is constant and well-determined and unexpected changes are not to be apprehended.

The arrangement of my system is as follows: First, the plant of water-pipes is made in such a manner that the entire quantity of water supplied can be directed to any point of the locality where pipes have been laid; second, on the plant of pipes a number of hydrants are erected to be used to fight the fire; third, every domestic-service branch of the pipe is provided with a valve closing automatically, consisting of a grooved piston or a movable diaphragm balanced by means of a piston and a counter-weight, and which allows a free flowing of the water in the branch pipes if the pressure is normal, but which closes and consequently cuts off this flow as soon as the pressure increases.

In the annexed drawings, Figure 1 shows a vertical section of a valve as used by me. Fig. 2 shows the application of my system in a plant, and Fig. 3 shows by a sectional view a modification of the valve illustrated in Fig. 1.

The valve shown in Fig. 1 is automatically closed when the pressure increases and opened in the same manner when the pressure decreases. It is provided with a valve K, which can be replaced by a grooved piston or removable diaphragm. A counter-weight P, acting upon arm L of the lever F, is heavy enough to overcome the normal pressure of the water in the pipe on the piston D, which is connected by rod R' with the arm of the same lever F. This rod also connects said valve and piston. The weight P is so proportioned to the area of piston D as to keep the valve K open under normal pressure; but when the pressure is increased in the pipes it becomes sufficient upon said piston to force valve K to its seat in spite of the pressure of the weight P, thus cutting off the supply for domestic purposes through the branch in which said valve is situated. When the fire is subdued, the pressure of the water is decreased to its normal standard, the valve K opens, and the water will circulate, as before. The pressure may be increased in the pipes by pumps or by reservoirs. Increased pressure in case of fire may be obtained by a quicker movement of the pump, (and in this case the plant must be isolated from the reservoir,) or the reservoir is connected with another one $x$, located so high as to give sufficient head to close the valves, which are balanced under normal pressure, and to throw the water in the hydrant to a sufficient height to fight the fire.

In Fig. 2 the length of the line H indicates graphically the normal pressure of water for domestic use, and H' the pressure desired in case of fire. $g$ $g^2$ $g^3$ show the branch pipes for domestic use, and $f$ $f'$ $f^2$ $f^3$ show the hydrants to be used in case of fire. In case of any pipes being broken or if more hydrants should be opened than is necessary, the pressure might be reduced to its normal standard, and thus again allow the delivery of water for domestic purposes. To avoid this difficulty, we should place on the branches for domestic or trade uses, especially on such having great delivery-valves, an automatic closing device which does not open again automatically if the pressure diminishes. A simple modification of the valve shown in Fig. 1 will be sufficient for this purpose. The lever F is provided with a kind of pawl $h$, which automatically engages the cover of the valve as the lever rises and keeps the lever in its raised position even when the pressure is diminished. To open the valve, it is sufficient to manually disengage the pawl $h$ from the cover.

Fig. 3 shows another apparatus, the valve of which remains closed even when the pressure decreases and which must be opened by hand. Under normal pressure the weight P is sufficiently effective to keep the valve open against the pressure of the water upon its under side. When thus open, the valve K rests upon a counter-seat at the bottom of the valve-chamber. When the pressure increases, it becomes sufficient to overcome the pressure of the weight P and the valve closes. When thus closed, a larger surface is exposed to the pressure of the water by its being lifted from its counter-seat. If in this case the pressure is reduced to the normal, the larger area of the valve acted upon by the diminished pressure will still be sufficient to counterpoise the weight P and the valve will remain closed.

It is evident for the purposes of balancing the valves for normal pressure that springs may be substituted for counter-weights upon the levers or bearing directly upon the valves. These automatically-closing valves may readily be substituted for those ordinarily in use and which are raised and lowered by means of a screw.

Having thus described my invention, what I claim as new, and desire to secure by Letters Patent, is—

In water-works, the combination, with a reservoir, a main therefrom, fire-hydrants connected with said main, and branch service-pipes, of pumps and an auxiliary reservoir for increasing the pressure in said main and automatic self-closing valves in said branch pipes adapted to operate under such increased pressure, substantially as set forth.

In testimony whereof I have signed my name to this specification in the presence of two subscribing witnesses.

NICHOLAS SIMIN.

Witnesses:
 S. LAMINE,
 M. LEVINSKY.